(12) United States Patent
Xue et al.

(10) Patent No.: US 12,369,184 B2
(45) Date of Patent: Jul. 22, 2025

(54) TECHNIQUES FOR PERFORMING SIDELINK DISCOVERY IN WIRELESS COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Piyush Gupta, Bridgewater, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/017,324

(22) Filed: Sep. 10, 2020

(65) Prior Publication Data

US 2021/0100027 A1 Apr. 1, 2021

Related U.S. Application Data

(60) Provisional application No. 62/906,525, filed on Sep. 26, 2019.

(51) Int. Cl.
*H04W 74/02* (2009.01)
*H04W 8/00* (2009.01)
(Continued)

(52) U.S. Cl.
CPC ......... *H04W 74/002* (2013.01); *H04W 8/005* (2013.01); *H04W 40/244* (2013.01);
(Continued)

(58) Field of Classification Search
CPC .......... H04W 74/008; H04W 74/0808; H04W 74/02; H04W 8/005; H04W 40/244;
(Continued)

(56) References Cited

U.S. PATENT DOCUMENTS 10,321,294 B2 6/2019 Chatterjee et al.
2014/0307611 A1* 10/2014 Tesanovic ............... H04W 4/06
370/312

(Continued)

FOREIGN PATENT DOCUMENTS

EP 3101991 A1 * 12/2016 .......... H04W 72/044
EP 3242520 A1 * 11/2017 .......... H04L 27/2657

OTHER PUBLICATIONS

Rastegardoost (U.S. Appl. No. 61/888,069 (prov069), filed Aug. 2019, published as US Pub. No.: 2021/0051707).*

(Continued)

*Primary Examiner* — Lakeram Jangbahadur
(74) *Attorney, Agent, or Firm* — ArentFox Schiff LLP

(57) ABSTRACT

Some aspects described herein relate to receiving a configuration defining resources for transmitting a first message in a two-step random access procedure, wherein the first message includes a random access preamble and a payload, generating a beacon signal for transmitting as the first message, where the beacon signal includes one or more parameters to facilitate discovery by other UEs for pairing in sidelink communications, and transmitting, based on the configuration, the beacon signal as the first message over the resources.

30 Claims, 7 Drawing Sheets

(51) Int. Cl.
| | |
|---|---|
| *H04W 40/24* | (2009.01) |
| *H04W 52/36* | (2009.01) |
| *H04W 56/00* | (2009.01) |
| *H04W 72/23* | (2023.01) |
| *H04W 74/00* | (2009.01) |
| *H04W 74/0808* | (2024.01) |
| *H04W 76/14* | (2018.01) |
| *H04W 76/27* | (2018.01) |
| *H04W 80/02* | (2009.01) |
| *H04W 92/18* | (2009.01) |

(52) U.S. Cl.
CPC ....... *H04W 52/365* (2013.01); *H04W 56/001* (2013.01); *H04W 72/23* (2023.01); *H04W 74/02* (2013.01); *H04W 74/0808* (2013.01); *H04W 76/14* (2018.02); *H04W 76/27* (2018.02); *H04W 80/02* (2013.01); *H04W 92/18* (2013.01)

(58) Field of Classification Search
CPC ... H04W 52/365; H04W 76/27; H04W 80/02; H04W 72/042; H04W 56/001; H04W 76/14; H04W 92/18; H04W 74/0833; H04L 5/0048
See application file for complete search history.

(56) References Cited

U.S. PATENT DOCUMENTS

| | | | |
|---|---|---|---|
| 2015/0245193 A1* | 8/2015 | Xiong | H04W 4/80 370/328 |
| 2016/0142898 A1* | 5/2016 | Poitau | H04W 8/005 370/329 |
| 2016/0302251 A1* | 10/2016 | Chatterjee | H04W 36/322 |
| 2019/0320467 A1* | 10/2019 | Freda | H04W 74/004 |
| 2021/0051673 A1* | 2/2021 | Chae | H04W 72/23 |
| 2021/0051707 A1* | 2/2021 | Rastegardoost | H04W 74/006 |
| 2021/0153263 A1* | 5/2021 | Wu | H04L 41/0853 |

OTHER PUBLICATIONS

Chae et al. (U.S. Appl. No. 62/887,582 (prov582), filed Aug. 2019, published as US Pub. No.: 2021/0051673).*
International Search Report and Written Opinion—PCT/US2020/050334—ISA/EPO—Dec. 21, 2020.

* cited by examiner

TECHNIQUES FOR PERFORMING SIDELINK DISCOVERY IN WIRELESS COMMUNICATIONS

CLAIM OF PRIORITY UNDER 35 U.S.C. § 119

The present Application for Patent claims priority to U.S. Provisional Patent Application No. 62/906,525, entitled "TECHNIQUES FOR PERFORMING SIDELINK DISCOVERY IN WIRELESS COMMUNICATIONS" filed Sep. 26, 2019, which is assigned to the assignee hereof and hereby expressly incorporated by reference herein for all purposes.

BACKGROUND

Aspects of the present disclosure relate generally to wireless communication systems, and more particularly, to performing sidelink communications among devices.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate with a base station to receive access to a wireless network and can also communicate with other UEs over a sidelink channel. Sidelink discovery is defined for devices to transmit and receive signals over a physical shared discovery channel (PSDCH) by repeatedly broadcasting a 232-bit message for other devices to receive and discover one another. Based on the discovery, the devices can communicate with one another over sidelink resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving a configuration defining resources for transmitting a first message in a two-step random access procedure, wherein the first message includes a random access preamble and a payload, generating a beacon signal for transmitting as the first message, where the beacon signal includes one or more parameters to facilitate discovery by other UEs for pairing in sidelink communications, and transmitting, based on the configuration, the beacon signal as the first message over the resources.

In another example, a method of wireless communication is provided that includes receiving a configuration defining resources for transmitting a first message in a two-step random access procedure, wherein the first message includes a random access preamble and a payload, and receiving, based on the configuration and from a different UE, the beacon signal as the first message over the resources, wherein the beacon signal includes one or more parameters to facilitate discovery of the different UE for pairing in sidelink communications.

In another example, a method of wireless communication is provided that includes generating, for a user equipment (UE), a configuration indicating random access resources to use for transmitting a beacon signal to facilitate discovery of the UE for pairing in sidelink communications, and transmitting, to the UE, the configuration.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for wireless communication is provided that includes a transceiver, a memory configured to store instructions, and one or more processors communicatively coupled with the transceiver and the memory. The one or more processors are configured to receive a configuration defining resources for transmitting a first message in a two-step random access procedure, where the first message includes a random access preamble and a payload, generate a beacon signal for transmitting as the first message, wherein the beacon signal includes one or more parameters to facilitate discovery by other UEs for pairing in sidelink communications, and transmit, based on the configuration, the beacon signal as the first message over the resources.

In another example, an apparatus for wireless communication is provided that includes a transceiver, a memory configured to store instructions, and one or more processors communicatively coupled with the transceiver and the memory. The one or more processors are configured to receive a configuration defining resources for transmitting a first message in a two-step random access procedure, where the first message includes a random access preamble and a payload, and receive, based on the configuration and from a different UE, a beacon signal as the first message over the resources, wherein the beacon signal includes one or more parameters to facilitate discovery of the UE for pairing in sidelink communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
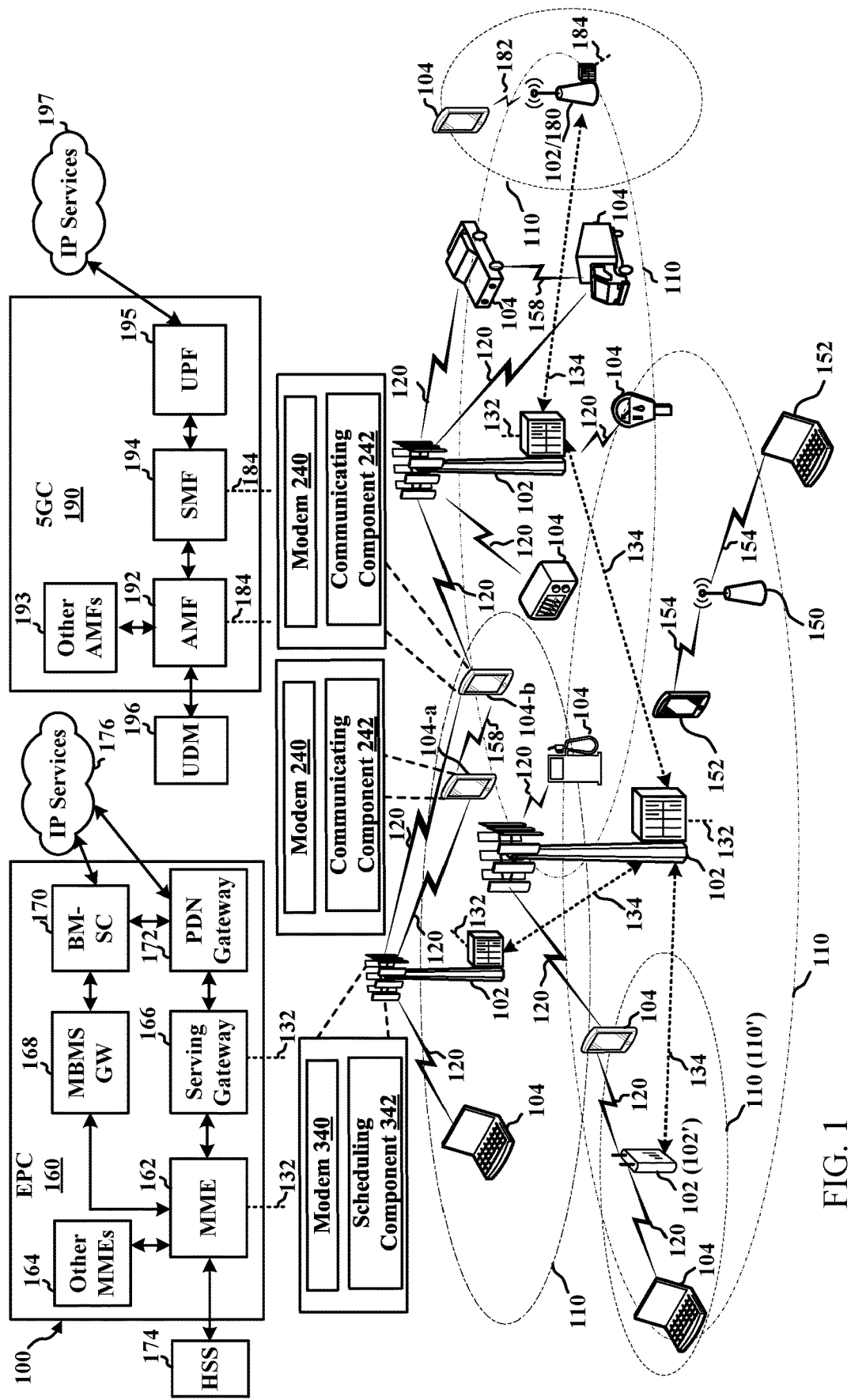
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing sidelink discovery of devices in wireless communications. For example, devices, such as user equipment (UEs), can transmit beacons to facilitate discovery of the devices by other nearby devices, which may also be UEs or other types of devices, etc. As devices are discovered, the devices can communicate with one another over a sidelink channel, which may not traverse an access point (e.g., a base station) or other network nodes. Rather, the sidelink channel can be over resources defined for direct communication between the devices. In one example, nearby UEs can formulate or otherwise be associated in a group of UEs for the sidelink communications to the members of the group. In one example, the base station can assist in establishing the group of UEs by triggering the UEs to transmit the beacon (e.g., as a random access channel (RACH) communication, such as a RACH preamble, in a RACH occasion (RO)), and/or to receive beacons from other UEs. In this regard, for example, UEs can transmit the beacon and nearby UEs can monitor for beacons from the UEs (and/or transmit their own beacons) to pair and/or establish a group with UEs within a certain distance (e.g., within a certain receive timing) for sidelink communications.

Sidelink discovery and sidelink communication are defined in third generation partnership project (3GPP) long term evolution (LTE) Release 12 for public safety usage (e.g., transmitting of public safety messages among UEs over the sidelink channel). This is performed by devices repeatedly broadcasting 232-bit messages over a physical shared discovery channel (PSDCH) with configured pool for PSDCH transmission, and pool of PSDCH reception. In 3GPP new radio (NR) Release 16, sidelink communications are further defined for enhanced vehicle-to-anything (eV2X) deployment, where sidelink communications are defined using physical sidelink control channel (PSCCH), physical sidelink shared channel (PSSCH), and physical sidelink feedback channel (PSFCH), without using PSDCH. In 3GPP NR, sidelink communications are broadcast/groupcast focused with some support for unicast. Additionally, discovery is defined through reading the PSSCH data transmitted by the UEs. 3GPP NR may be used to apply the sidelink to cover other vertical domains, such as industrial Internet-of-Things (IIoT), using eV2X side-link as the baseline.

In addition, two-step random access procedures are defined in 3GPP NR where UEs transmit a first message (msgA), which includes a preamble portion (e.g., a physical RACH (PRACH) preamble, similar to msg1 in a four-step random access procedure) along with a payload portion (e.g., physical uplink shared channel (PUSCH) payload, similar to msg3 in a four-step random access procedure), without waiting for a hand-shaking indication from the base station (e.g., msg2 in the four-step random access procedure). In response to msgA, a base station (e.g., gNB) transmits msgB in response, which may be similar to a random access response (RAR) (e.g., msg2 in the four-step random access procedure), which may also include a contention resolution message (e.g., msg4 in the four-step random access procedure, where the random access procedure is contention-based).

The one-shot TX of preamble and PUSCH can enable two-step random access messages to be used for carrying sidelink discovery signal (also referred to herein as a "beacon"). The maximum payload size for PUSCH can be 1 kilobit, which can be enough to carry a sidelink discovery message, as defined herein. In addition, the code division multiple access (CDMA) nature of RACH occasion (where preamble is transmitted) and the space division multiple access (SDMA) nature of PUSCH occasion (where PUSCH is transmitted over defined demodulation reference signal (DMRS) port/sequence) can also assist random access. By carrying discovery over two-step RACH under network control, network controlled discovery can be implemented. The high quality-of-service (QoS) requirement in IIoT, however, can add complexity to autonomous discovery (e.g., without network control), as it can be typically time and energy consuming, employing sophisticated scanning and security procedures often involving higher layers, which makes efficient peer discovery and pairing procedures difficult or too slow for the considered QoS.

Additionally, two-step RACH can be preferably used over other signals, such as sounding reference signal (SRS), to facilitate discovery as RACH communications can have many advantages. For example, two-step RACH is defined per-cell while SRS is defined per-UE, which can mean that more signaling overhead occurs for arranging beacon transmission by a sub-set of UEs and beacon reception by another sub-set of UEs for the SRS based approach. Also, for example, two-step RACH can carry self-contained message while SRS is a signal, which can mean that the side information that can be carried by "modulating" SRS (e.g., comb type, sequence, etc.) can be limited. Moreover, two-step RACH can be used for non-radio resource control (RRC)-connected mode UEs, which can facilitate a-priori discovery, whereas SRS based approach may only be used for a-posteriori discovery with RRC connection established.

Accordingly, aspects described herein can facilitate discovery of UEs by transmitting the sidelink discovery beacon (also referred to herein as a "beacon" or "beacon signal") as a modified message in a random access procedure (e.g., as a modified msgA in a two-step random access procedure). The response from a candidate pairing UE to the beacon can also be transmitted using the modified message in the random access procedure (e.g., as a modified msgA in the two-step random access procedure). In addition, the access point can use a modified message in the random access procedure (e.g., as a modified msgB in the two-step random access procedure) to control the sidelink discovery transmission.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting and/or receiving sidelink discovery beacons using random access resources, as described herein. In addition, some nodes may have a modem 340 and scheduling component 342 for configuring UEs to transmit and/or receive sidelink discovery beacons using random access resources, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104-a (and/or other UEs) can transmit a sidelink discovery beacon using random access resources, and communicating component 242 of UE 104-b (and/or other UEs) can receive the sidelink discovery beacon over the random access resources. UE 104-b can determine whether to pair with UE 104-a for sidelink communications based on the sidelink discovery beacon. In one example, UE 104-b may indicate a pairing with UE 104-a by transmitting a response message using random access resources. The discovery beacon and/or response message to the discovery beacon can be random access messages defined as part of a random access procedure (e.g., with the base station 102), such as msgA in a two-step random access procedure. Scheduling component 342 of a base station 102 can configure the UEs 104-a, 104-b with the random access resources and/or parameters for using the random access resources to transmit beacons, receive beacons, and/or transmit corresponding response messages.

Figure 2:
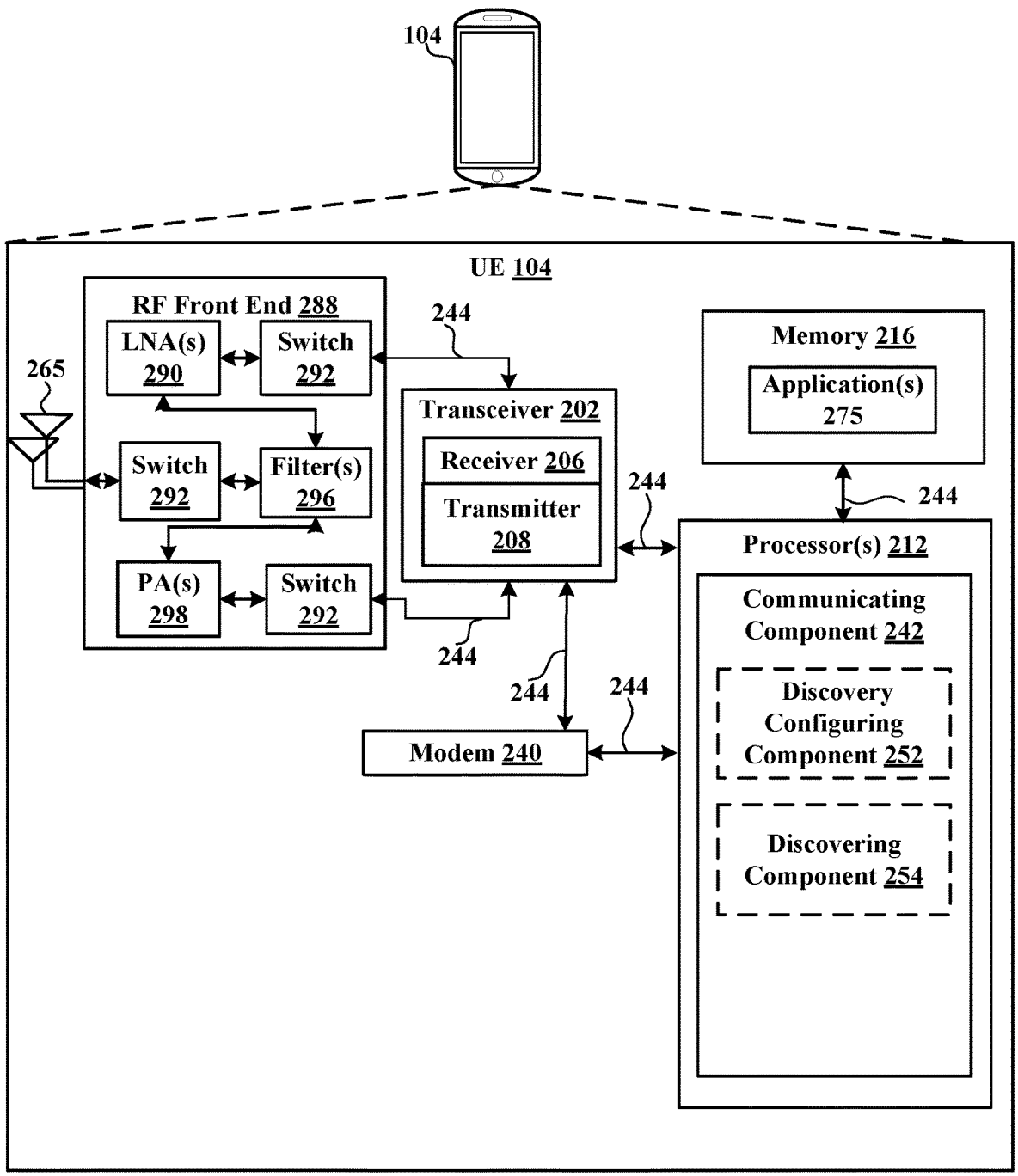
FIG. 2 is a block diagram illustrating an example of a UE, in accordance with various aspects of the present disclosure.
Figure 3:
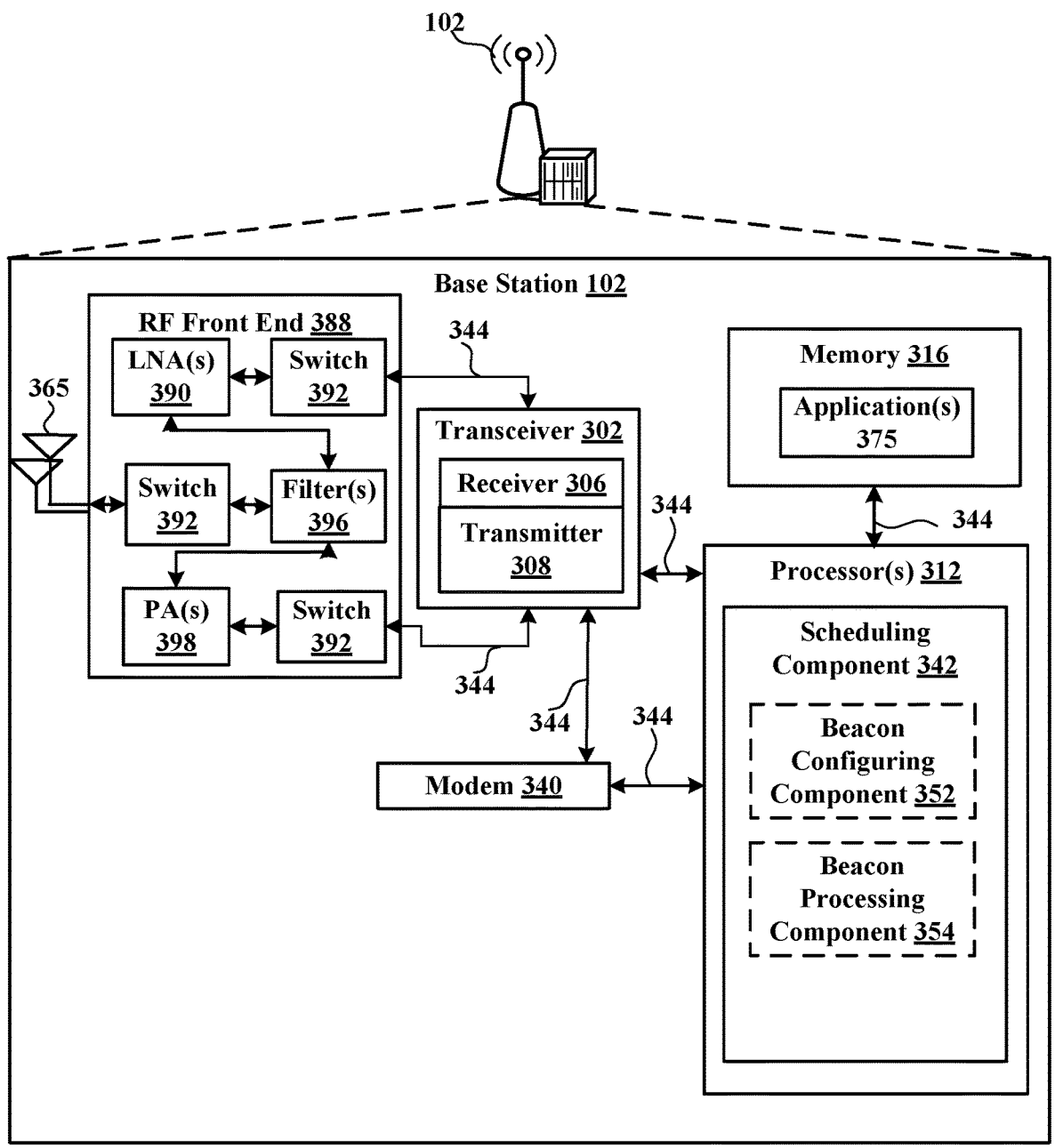
FIG. 3 is a block diagram illustrating an example of a base station, in accordance with various aspects of the present disclosure.
Figure 4:
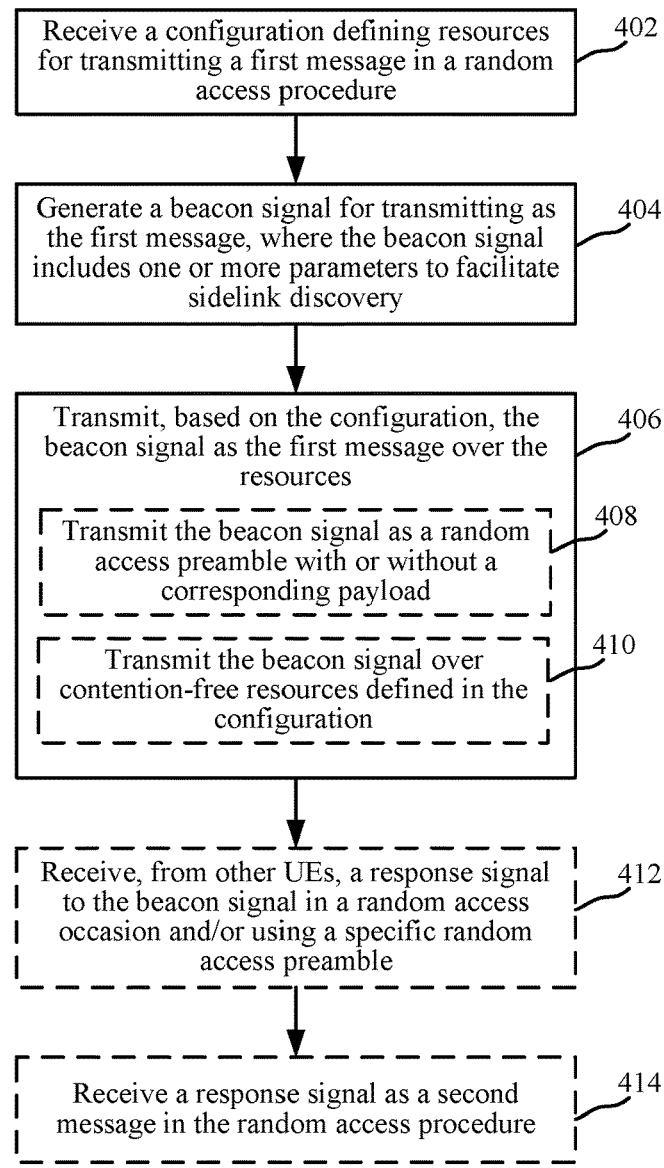
FIG. 4 is a flow chart illustrating an example of a method for transmitting sidelink discovery beacons, in accordance with various aspects of the present disclosure.
Figure 5:
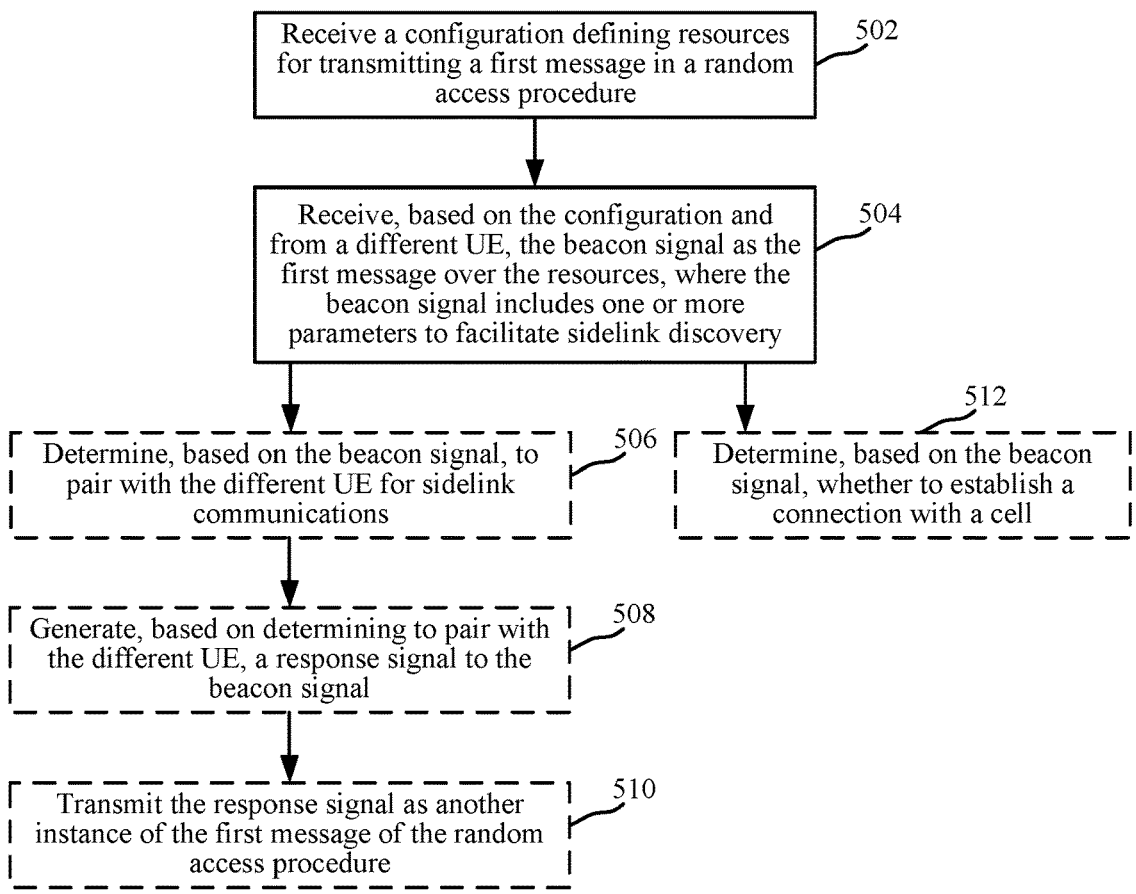
FIG. 5 is a flow chart illustrating an example of a method for receiving sidelink discovery beacons, in accordance with various aspects of the present disclosure.
Figure 6:
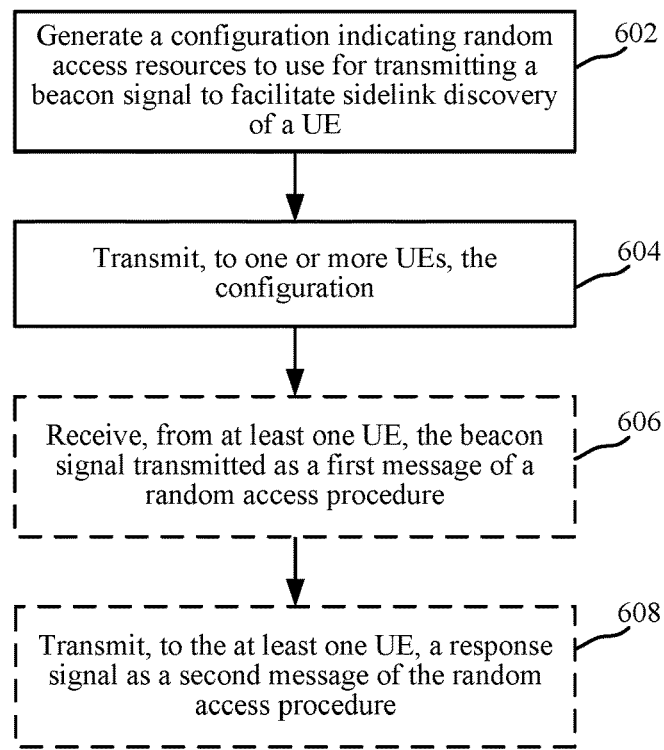
FIG. 6 is a flow chart illustrating an example of a method for configuring UEs to transmit or receive sidelink discovery beacons, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting and/or receiving sidelink discovery beacons over random access resources, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a discovery configuring component 252 for configuring transmission of sidelink discovery beacons (e.g., based on a received configuration), and/or a discovering component 254 for receiving the sidelink discovery beacons, as described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring UEs for transmitting and/or receiving sidelink discovery beacons from one another, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a beacon configuring component 352 for configuring transmission and/or reception of sidelink discovery beacons over random access resources, and/or a beacon processing component 354 for receiving one or more sidelink discovery beacons and/or transmitting an indication of receipt and/or one or more parameters for establishing or communicating in the group of UEs for sidelink communications.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for transmitting sidelink discovery beacons. FIG. 5 illustrates a flow chart of an example of a method 500 for receiving sidelink discovery beacons. Methods 400 and 500 are described in conjunction with one another for ease of explanation, though the methods 400 and 500 are not required to be performed in conjunction. In an example, a UE (e.g., UE 104-*a*) can perform the functions described in method 400 using one or more of the components described in FIGS. 1 and 2 and/or another UE (e.g., 104-*b*) can perform the functions described in method 500 using one or more of the components described in FIGS. 1 and 2 (and in one example, a given UE 104 can be configured to perform both methods 400 and 500).

In method 400, at Block 402, a configuration defining resources for transmitting a first message in a random access procedure can be received. In an aspect, discovery configuring component 252, e.g., in conjunction with processor(s) 212, memory 216, transceiver 202, communicating component 242, etc., can receive the configuration defining the resources for transmitting the first message in the random access procedure. As described above and further herein, in one example, a base station 102 can configure multiple UEs to transmit and receive messages in the random access procedure, which may be for the purpose of performing a random access procedure or for communicating random access messages as sidelink discovery beacons. The configuration may indicate random access resources over which sidelink discovery beacons can be transmitted and/or received by UEs. The configuration may accordingly indicate random access occasions, which can include time and frequency resources, over which sidelink discovery beacons can be transmitted, random access preambles to use in transmitting the sidelink discovery beacons, a specific set of random access preambles that can be used within a specific set of random access occasions, and/or the like. For example, the random access occasions and/or preamble defined for the beacons can be a subset of those defined for performing random access procedures for establishing a connection with a base station 102. In another example, the configuration may also indicate corresponding PUSCH resource units for transmitting the a payload portion of the random access message (e.g., msgA) or transmitting a payload portion for the random access message as the beacon.

In addition, for example, discovery configuring component 252 can receive the configuration in system information (SI) signaling, remaining minimum system information (RMSI) signaling, radio resource control (RRC) signaling, a media access control (MAC) control element (CE), or downlink control information (DCI) from the base station. In another example, the configuration can define one or more parameters or triggers for transmitting or determining when to transmit the beacon, such as a signal power or quality threshold with respect to a specific synchronization signal block (SSB) received from a base station, where the signal power or quality may be measured as reference signal received power (RSRP), reference signal received quality (RSRQ), received signal strength indicator (RSSI), signal-to-noise ratio (SNR), etc. In another example, the one or more parameters defined in the configuration may include a prohibit time between transmitting two beacon signals, an allowed transmit power range or defined transmit power for transmitting the beacon signal, and/or the like. In other examples, the configuration may define contention-free resources for transmitting the beacon. As described further herein, the UE 104 can transmit the beacon based on one or more parameters defined in the configuration and/or one or more triggers detected as occurring based on one or more parameters defined in the configuration.

In method 500, at Block 502, a configuration defining resources for transmitting a first message in a random access procedure can be received. In an aspect, discovering component 254, e.g., in conjunction with processor(s) 212, memory 216, transceiver 202, communicating component 242, etc., can receive the configuration defining the resources for transmitting the first message in the random access procedure. This can be similar to receiving the configuration by discovery configuring component 252, as described in reference to Block 402 of method 400 above.

In method 400, at Block 404, a beacon signal for transmitting as the first message can be generated, where the beacon signal includes one or more parameters to facilitate sidelink discovery. In an aspect, discovery configuring component 252, e.g., in conjunction with processor(s) 212, memory 216, transceiver 202, communicating component 242, etc., can generate the beacon signal for transmitting as the first message, where the beacon signal includes one or more parameters to facilitate sidelink discovery. In this regard, as described, the beacon signal can be a sidelink discovery beacon for transmitting to one or more other UEs (e.g., UE 104-*b*) to facilitate discovering UE 104-*a* for establishing sidelink communications therewith (e.g., pairing with the UE 104-*a* or a group of UEs including UE 104-*a* for sidelink communications).

In one example, discovery configuring component 252 can generate the beacon signal as a random access preamble in a random access occasion based on the configuration received from the base station 102. As described, for example, the configuration can indicate the random access preambles and/or occasions that can be used for sidelink discovery beacons, and discovery configuring component 252 can accordingly select a random access preamble and/or occasion for transmitting the sidelink discovery beacon. For example, discovery configuring component 252 can generate the beacon signal to include one or more parameters related to sidelink communications with the UE 104, such as a UE identifier of the UE 104, a transmit power used to transmit the beacon signal (which may enable a receiving UE to determine whether to pair with the UE 104 based on the received signal strength of the beacon signal), a power headroom of the UE 104 when transmitting the beacon (which may also be used to evaluate the transmit power used for the beacon signal, a category identifier with respect to sidelink discovery, etc. In another example, discovery configuring component 252 can indicate, in the sidelink discovery beacon, parameters for sending a response message to the beacon (e.g., a response message from another UE to pair with the UE transmitting the beacon), where the parameters can include a receiving window specified by random access occasions during which a response message is expected to be received, random access preambles expected to be used to indicate the response message, etc.). In yet another example, discovery configuring component 252 can generate the beacon signal as a preamble without parameters described above. Moreover, in an example, discovery configuring component 252 can generate the beacon signal based on detecting one or more triggers indicated in the configuration for transmitting a sidelink discovery beacon, as described.

In method 400, at Block 406, the beacon signal can be transmitted, based on the configuration, as the first message over the resources. In an aspect, discovery configuring component 252, e.g., in conjunction with processor(s) 212, memory 216, transceiver 202, communicating component 242, etc., can transmit, based on the configuration, the beacon signal as the first message over the resources. For example, discovery configuring component 252 can transmit the beacon signal as or including a random access preamble (e.g., using a random access preamble defined by the configuration for sidelink discovery beacons) and/or can transmit the beacon signal in a random access occasion defined by the configuration for sidelink discovery beacons.

For example, discovery configuring component 252 can transmit the beacon signal based on one or more other parameters defined in the configuration, such as a signal power/quality threshold with respect to a specific SSB. In this example, discovery configuring component 252 can determine if the signal power/quality threshold is achieved for the SSB received from the base station 102, and if so can transmit the beacon. In another example, where the one or more parameters include a prohibit time between transmitting beacons, discovery configuring component 252 can initialize a timer after transmitting a first beacon, and can determine to transmit the beacon at Block 406 based on determining that the timer expired. In yet another example, where the one or more parameters include a transmit power or an allowed transmit power range, discovery configuring component 252 can transmit the beacon based on the transmit power or based on selecting a transmit power that is within the transmit power range.

In addition, for example, discovery configuring component 252 may include parameters relating to sidelink discovery and/or establishing sidelink communications, such as UE ID, transmit power, power headroom, category ID, etc., as described above, or may transmit the beacon without such parameters. Accordingly, in an example, discovery configuring component 252 can transmit the beacon signal as random access preamble and payload, where the payload portion can include one or more parameters, or as a random access preamble without a payload portion (without parameters), etc.

Thus, in transmitting the beacon signal at Block 406, optionally at Block 408, the beacon signal can be transmitted as a random access preamble with or without a corresponding payload. In an aspect, discovery configuring component 252, e.g., in conjunction with processor(s) 212, memory 216, transceiver 202, communicating component 242, etc., can transmit the beacon signal as the random access preamble with or without the corresponding payload (e.g., in a two-step random access procedure). In either case, a receiving UE can use the beacon signal as a sidelink discovery signal to discover UEs for establishing a sidelink communication pairing or group therewith.

In another example, in transmitting the beacon signal at Block 406, optionally at Block 410, the beacon signal can be transmitted over contention-free resources defined in the configuration. In an aspect, discovery configuring component 252, e.g., in conjunction with processor(s) 212, memory 216, transceiver 202, communicating component 242, etc., can transmit the beacon signal over contention-free resources defined in the configuration. As described, in an example, the base station 102 can indicate contention-free resources in the configuration to be used by multiple UEs for transmitting and/or receiving the beacon signals, and thus discovery configuring component 252 can use the contention-free resources to transmit the beacon signal without contention from other UEs (e.g., over the sidelink) or base station 102 (e.g., over downlink). In one example, discovery configuring component 252 can use the contention-free resources depending on urgency for transmitting the beacon.

In method 500, at Block 504, the beacon signal can be received, based on the configuration and from a different UE, as the first message over the resources, where the beacon signal includes one or more parameters to facilitate sidelink discovery. In an aspect, discovering component 254, e.g., in conjunction with processor(s) 212, memory 216, transceiver 202, communicating component 242, etc., can receive, based on the configuration and from the different UE, the beacon signal as the first message over the resources, where the beacon signal includes the one or more parameters to facilitate sidelink discovery. In one example, this can be the first message transmitted by the different UE as described in reference to Block 406 of method 400 above. As such, the first message may include a random access preamble received in a random access occasion and/or a payload portion received with the random access preamble. The random access preamble and/or the payload portion may include parameters such as a UE ID, transmit power, power headroom, category ID (e.g., for sidelink communications), and/or the like. For example, discovering component 254 can use the parameters to determine whether to pair or group with the different UE and/or other UEs for sidelink communications. In one example, discovering component 254 can receive signals from multiple different UEs in searching and/or monitoring for the beacon signals based on the resources indicated in the configuration.

In method 500, optionally at Block 506, it can be determined, based on the beacon signal, to pair with the different UE for sidelink communications. In an aspect, discovering component 254, e.g., in conjunction with processor(s) 212, memory 216, transceiver 202, communicating component 242, etc., can determine, based on the beacon signal, to pair with the different UE for sidelink communications. For example, discovering component 254 can determine to pair or group with the different UE based on one or more properties of the beacon (e.g., a signal strength or quality of the beacon), or one or more parameters defined in the beacon (e.g., UE ID, transmit power, power headroom, category ID, etc.), and/or the like.

For example, discovering component 254 can determine to pair or group with certain UEs based on UE ID specified in the beacon, for certain types or categories of sidelink communication based on a category ID specified in the beacon, etc. In one example, discovering component 254 can use the transmit power specified in the beacon to determine whether it can be a peer/pairing UE for the UE transmitting the beacon (e.g., using proximity discovery, which may be based on comparing a received signal power for the beacon to the transmit power). In another example, discovering component 254 can use the transmit power and power headroom specified in the beacon to further determine it whether it can be a peer/pairing UE for the UE transmitting the beacon (e.g., using refined proximity discovery, which may be based on comparing a received signal power for the beacon to the transmit power and considering the power headroom).

In method 500, optionally at Block 508, a response signal to the beacon signal can be generated, based on determining to pair with the different UE. In an aspect, discovering component 254, e.g., in conjunction with processor(s) 212, memory 216, transceiver 202, communicating component 242, etc., can generate, based on determining to pair with the different UE, the response signal to the beacon signal. For example, the response signal can be generated to indicate pairing with the different UE. In one example, this can include generating the response message using a certain random access preamble (e.g., where the configuration and/or beacon signal can indicate the random access preambles that can be used to generate the response message). For example, discovering component 254 can generate the response signal to include an indication that the UE receiving the beacon signal identifies itself as a candidate pairing UE to the UE that transmits the beacon signal. In addition, for example, discovering component 254 can generate the response signal to include a UE identifier and/or other parameters, which may be indicated in a payload portion. In another example, discovering component 254 can generate the response signal as the random access preamble without the payload portion.

In method 500, optionally at Block 510, the response signal can be transmitted as another instance of the first message of the random access procedure. In an aspect, discovering component 254, e.g., in conjunction with processor(s) 212, memory 216, transceiver 202, communicating component 242, etc., can transmit the response signal as another instance of the first message of the random access procedure. In one example, this can include generating the response signal for transmission using a certain random access occasion (e.g., where the configuration and/or beacon signal can indicate the random access occasions that can be used to generate the response message). In one example, where the configuration and/or beacon signal indicates the receiving window, the configuration and/or beacon signal may indicate random access occasions and/or preamble subset (e.g., subset of those configured in the configuration for transmitting the beacon signal) to be used for transmitting the response signal within the receiving window. Similarly, in one example, the configuration received in Block 502 (and/or in Block 402) or a separate configuration received from the base station 102 (e.g., over RRC, MAC-CE, DCI, etc.) may indicate parameters for reporting discovered beacons to the transmitting UE and/or to the base station 102 to assist in UE pairing/grouping for sidelink communications. In an example, discovering component 354 can transmit the response signal, which may indicate discovered beacons, to the transmitting UE and/or to the base station 102.

In method 400, optionally at Block 412, a response signal to the beacon signal can be received, from other UEs, in a random access occasion and/or using a specific random access preamble. In an aspect, discovery configuring component 252, e.g., in conjunction with processor(s) 212, memory 216, transceiver 202, communicating component 242, etc., can receive, from other UEs, the response signal to the beacon signal in a random access occasion and/or using a specific random access preamble. As described, the random access occasion and/or random access preamble can include one of a set defined in the configuration and/or a subset defined in the beacon for communicating the response signal. For example, the response signal can indicate that the other UE identifies itself as a candidate pairing UE. In addition, for example, the response signal may include a UE identifier and/or other parameters, which may be indicated in a payload portion. In another example, discovery configuring component 252 can receive the response signal as the random access preamble without the payload portion. In any case, discovery configuring component 252 may establish a sidelink channel with the other UE based on receiving the response signal and/or based on one or more parameters associated with the response signal, such as a signal quality or power, etc. In another example, discovering component 254 of the other UE may determine to establish the sidelink channel with UE 104 based on receiving the response signal.

In method 400, optionally at Block 414, a response signal can be received as a second message in the random access procedure. In an aspect, discovery configuring component 252, e.g., in conjunction with processor(s) 212, memory 216, transceiver 202, communicating component 242, etc., can receive the response signal (e.g., a response to the beacon signal) as the second message in the random access procedure. For example, discovery configuring component 252 can receive the response signal from a base station 102, such as a base station 102 that transmits the configuration received at Block 402 and/or that configures at least one of random access operations, sidelink communication resources, etc. for the UE 104. For example, discovery configuring component 252 can receive the second message as a RAR (or msgB) in the two-step random access procedure. For example, the response signal can indicate that the beacon is received by the base station 102. In another example, the response signal can indicate additional information regarding sidelink communications with the UE 104 and/or other UEs, such as a count of a number of peer/pairing sidelink UEs available in a cell provided by the base station 102. In addition, for example, the UE 104 and/or other UEs can use the additional information to determine whether to establish sidelink communications and/or whether to establish communications in the cell (e.g., with base station 102). For example, communicating component 242 can establish sidelink communications with the other UEs based on the additional information.

In another example, the response signal can indicate a count of a number of times the UE 104 is to transmit the beacon, and discovery configuring component 252 can transmit (e.g., retransmit) the beacon up to and/or at the number of (extra) times. In one example, discovery configuring component 252 can transmit the beacon (e.g., based on receiving the count or otherwise) using a transmit power ramping procedure, similar to that used for random access, to start with a smaller transmit power and increasing power for each of multiple beacon transmissions to allow causing automatic gain control (AGC) to nearby UEs.

In method 500, optionally at Block 512, it can be determined whether to establish, based on the beacon signal, a connection with the cell. In an aspect, discovering component 254, e.g., in conjunction with processor(s) 212, memory 216, transceiver 202, communicating component 242, etc., can determine, based on the beacon signal, whether to establish the connection with the cell. For example, where the UE 104 is in a non-RRC-connected mode with respect to the cell, discovering component 254 can receive the beacon signal(s) at Block 502 and can read information in or represented by the beacon signal(s) to determine whether to join the cell. For example, discovering component 254 can determine whether the cell has a desired sidelink peer and/or enough number of peer UEs (e.g., based on reading UE identifiers from the beacon(s), determining a number of beacons from distinct UEs, and/or the like). Where the desired criteria is detected, discovering component 254 may determine to join the cell (e.g., as a non-RRC-connected UE or by performing a random access procedure to transition to connected mode).

FIG. 6 illustrates a flow chart of an example of a method 600 for configuring UEs to transmit and/or receive sidelink discovery beacons. In an example, a base station 102 can perform the functions described in method 600 using one or more of the components described in FIGS. 1 and 3.

In method 600, at Block 602, a configuration indicating random access resources to use for transmitting a beacon signal to facilitate sidelink discovery of a UE can be generated. In an aspect, beacon configuring component 352, e.g., in conjunction with processor(s) 312, memory 316, transceiver 302, scheduling component 342, etc., can receive, from multiple UEs, one or more signals. For example, beacon configuring component 352 can generate the configuration indicating random access resources to use for transmitting and/or receiving the beacon signal to facilitate sidelink discovery of the UE. For example, as described, the configuration can indicate random access occasions and/or preambles that can be used to transmit sidelink discovery beacons, which may be a subset of random access occasions and/or preambles (and/or subsets of preambles for each of a subset of occasions, etc.) configured for performing random access procedures. Moreover, for example, beacon configuring component 352 can generate the configuration to include sets of random access preambles and/or occasions for UEs to use in transmitting and/or receiving a response signal to the beacon signal, which may also be a subset of random access occasions and/or preambles (and/or subsets of preambles for each of a subset of occasions, etc.) configured for performing random access procedures. For example, these sets of random access preambles and/or occasions may be different or the same sets as configured for transmitting and/or receiving the beacon signal.

In addition, in an example, beacon configuring component 352 can include additional information in the configuration, such as one or more parameters related to triggers for determining to transmit beacon signals using the random access resources and/or related to actual transmission of the beacon signals using the random access resources. For example, the one or more parameters may include a signal power/quality threshold with respect to a specific SSB that can trigger the UE to transmit the beacon, a prohibit time between transmitting two beacons by the UE, a transmit power or an allowed transmit power range for transmitting the beacon by the UE, etc. In one example, the configuration may specify a transmit power that is larger than a value determined by uplink power control (ULPC) over PRACH. In yet another example, the configuration may include an indication of contention-free resources over which the UE can transmit the beacon depending on urgency of transmitting the beacon.

In method 600, at Block 604, the configuration can be transmitted to one or more UEs. In an aspect, beacon configuring component 352, e.g., in conjunction with processor(s) 312, memory 316, transceiver 302, scheduling component 342, etc., can transmit, to one or more UEs, the configuration. For example, beacon configuring component 352 can transmit the configuration in SI signaling, RMSI signaling, RRC signaling, MAC CE, DCI, a combination thereof, etc., as described. In an example, beacon configuring component 352 can transmit the configuration for transmitting and/or receiving beacon signals as a separate or same configuration as that for transmitting and/or receiving response signals to the beacon signals.

In method 600, optionally at Block 606, the beacon signal transmitted as a first message of a random access procedure can be received from at least one UE. In an aspect, beacon processing component 354, e.g., in conjunction with processor(s) 312, memory 316, transceiver 302, scheduling component 342, etc., can receive, from the at least one UE, the beacon signal transmitted as a first message of the random access procedure (e.g., based on the configuration, as described above in Block 406 of method 400). Thus, for example, beacon processing component 354 can receive the beacon signal as a random access preamble and/or payload portion transmitted in a random access occasion. For example, the beacon signal may include a first message (msgA) from the transmitting UE attempting to initiate sidelink communications or a first message (msgA) from one or more receiving UEs reporting the received beacon signal.

In method 600, optionally at Block 608, a response signal can be transmitted, to the at least one UE, as a second message of the random access procedure. In an aspect, beacon processing component 354, e.g., in conjunction with processor(s) 312, memory 316, transceiver 302, scheduling component 342, etc., can transmit, to the at least one UE, the response signal as the second message of the random access procedure (e.g., as msgB in a two-step random access procedure, which may include a RAR and/or contention resolution information). For example, the response signal may include additional information, such as an indication that the beacon is successfully received (which may be an explicit indicator or implicit by transmitting the signal), a count of a number of peer/pairing sidelink UEs available in the cell provided by the base station 102 (e.g., a count or identification of a number of UEs that received and reported the beacon signal of the transmitting UE), a count of a number of times the UE is to transmit the beacon signal (e.g., after transmitting the initial beacon signal received by the base station 102), etc.

Figure 7:
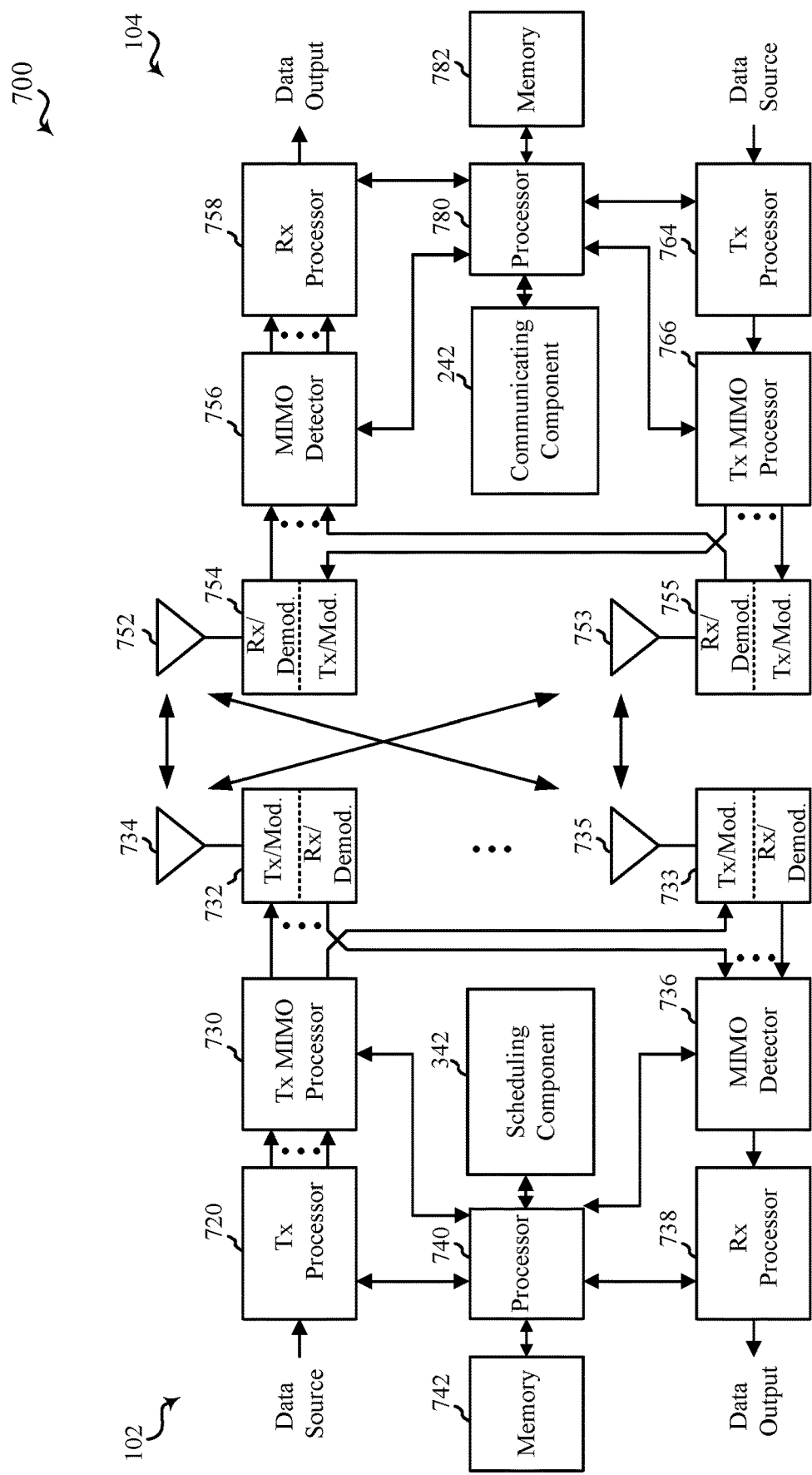
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104, in accordance with various aspects of the present disclosure. The MIMO communication system 700 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/ demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, at a user equipment (UE), comprising:
   receiving a configuration defining resources for transmitting a first message in a two-step random access procedure, wherein the first message includes a random access preamble and a payload;
   generating a beacon signal for transmitting as the first message, wherein the beacon signal includes one or more parameters to facilitate discovery by other UEs for pairing in sidelink communications; and
   transmitting, based on the configuration, the beacon signal as the first message over the resources.

2. The method of example 1, wherein the one or more parameters include at least one of an identifier of the UE, a transmission power used by the UE in transmitting the beacon signal, a power headroom at the UE, or a category identifier for sidelink discovery of the UE.

3. The method of any of examples 1 or 2, wherein transmitting the beacon signal includes transmitting the beacon signal as the random access preamble with or without the payload.

4. The method of any of examples 1 to 3, wherein the configuration defines resources for transmitting the beacon signal as the first message, wherein the resources include a subset of resources defined as random access occasions for transmitting the random access preamble.

5. The method of any of examples 1 to 4, wherein the configuration defines random access preambles of all or a subset of random access occasions for transmitting the beacon signal as the first message.

6. The method of any of examples 1 to 5, wherein receiving the configuration comprises receiving, from an access point, at least one of system information (SI), radio resource control (RRC) signaling, a media access control (MAC) control element (CE), or downlink control information (DCI), that includes the configuration.

7. The method of any of examples 1 to 6, wherein the configuration further defines at least one of a signal power or quality threshold with respect to a specific synchronization signal block, a prohibit time between transmitting two beacon signals, or an allowed transmit power range for transmitting the beacon signal.

8. The method of any of examples 1 to 7, wherein the configuration further defines a contention-free resources for transmitting the beacon signal, and wherein transmitting the beacon signal is over the contention-free resources.

9. The method of any of examples 1 to 8, wherein the one or more parameters indicate response resources for receiving a response signal in response to the beacon signal from the other UEs, and further comprising receiving, from the other UEs, the response signal in response to the beacon signal.

10. The method of example 9, wherein the one or more parameters indicate the response resources as at least one of a random access occasion over which to transmit the response signal or a second random access preamble to use in transmitting the response signal.

11. The method of any of examples 1 to 10, further comprising receiving, from an access point, a response signal as a second message in the two-step random access procedure, wherein the response signal indicates the beacon signal is successfully received.

12. The method of example 11, wherein the response signal also indicates a number of UEs available at a cell of the access point for pairing for sidelink communications.

13. The method of any of examples 11 or 12, wherein the response signal further indicates a number of instances of the beacon signal to transmit following the response signal.

14. The method of any of examples 1 to 13, wherein transmitting the beacon signal comprises transmitting multiple beacon signals based on a transmit power ramping.

15. A method for wireless communication, at a user equipment (UE), comprising:
   receiving a configuration defining resources for transmitting a first message in a two-step random access procedure, wherein the first message includes a random access preamble and a payload; and
   receiving, based on the configuration and from a different UE, a beacon signal as the first message over the resources, wherein the beacon signal includes one or more parameters to facilitate discovery of the different UE for pairing in sidelink communications.

16. The method of example 15, further comprising determining, based on the beacon signal, to pair with the different UE for sidelink communications.

17. The method of example 16, wherein determining to pair with the different UE comprises determining whether a transmit power indicated in the beacon signal achieves a threshold.

18. The method of example 17, wherein determining to pair with the different UE comprises additionally determining whether a transmit power headroom indicated in the beacon signal achieves a second threshold.

19. The method of any of examples 16 to 18, further comprising:
   generating, based on determining to pair with the different UE, a response signal to the beacon signal; and
   transmitting the response signal as another instance of the first message of the two-step random access procedure.

20. The example of claim 19, wherein the one or more parameters further indicate response resources for transmitting the response signal.

21. The method of example 20, wherein the one or more parameters indicate the response resources as at least one of a random access occasion over which to transmit the response signal or a second random access preamble to use in transmitting the response signal.

22. The method of any of examples 19 to 21, wherein the configuration further defines response resources for transmitting the response signal.

23. The method of any of examples 15 to 22, further comprising determining, based on the beacon signal, whether to establish a connection with a cell of an access point.

24. A method for wireless communication, comprising:
   generating, for a user equipment (UE), a configuration indicating random access resources to use for transmitting a beacon signal to facilitate discovery of the UE for pairing in sidelink communications; and transmitting, to the UE, the configuration.

25. The method of example 24, wherein transmitting the configuration comprises transmitting, to the UE, at least one of system information (SI), radio resource control (RRC) signaling, a media access control (MAC) control element (CE), or downlink control information (DCI), that includes the configuration.

26. The method of any of examples 24 or 25, wherein the configuration further indicates contention-free resources for transmitting the beacon signal.

27. The method of any of examples 24 to 26, wherein the configuration further indicates at least one of a signal power or quality threshold with respect to a specific synchronization signal block, a prohibit time between transmitting two beacon signals, or an allowed transmit power range for transmitting the beacon signal.

28. The method of any of examples 24 to 27, wherein the configuration further indicates second random access resources to use for reporting receiving of the beacon signal.

29. The method of any of examples 24 to 28, wherein the configuration further indicates at least one of a signal power or quality threshold with respect to a specific synchronization signal block, a prohibit time between transmitting two beacon signals, or an allowed transmit power range for transmitting the beacon signal.

30. The method of any of examples 24 to 29, further comprising:
receiving, from the UE, the beacon signal transmitted as a first message of a two-step random access procedure over the random access resources; and
transmitting, to the UE, a response signal as a second message of the two-step random access procedure.

31. The method of example 30, wherein the response signal indicates successful receipt of the beacon signal.

32. The method of any of examples 30 or 31, wherein the response signal indicates a number of UEs available at a cell for pairing for sidelink communications.

33. The method of any of examples 30 to 32, wherein the response signal indicates a number of instances of the beacon signal to transmit following the response signal.

34. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in any of examples 1 to 33.

35. An apparatus for wireless communication, comprising means for performing the operations of one or more methods in any of examples 1 to 33.

36. A computer-readable medium, comprising code executable by one or more processors to perform the operations of one or more methods in any of examples 1 to 33.

What is claimed is:

1. A method for wireless communication, at a user equipment (UE), comprising:
receiving a configuration defining resources for transmitting a first message in a two-step random access procedure, wherein the first message includes a preamble portion and a payload portion, wherein the preamble portion includes a random access preamble, and wherein the payload portion includes a physical uplink shared channel (PUSCH) for transmitting, by the UE, uplink communications to a network node;
generating, at the UE, a beacon signal as the first message in the two-step random access procedure such that the PUSCH of the first message includes one or more parameters of the beacon signal discoverable by other UEs for use in pairing with the UE in sidelink communications; and
transmitting, based on the configuration, the beacon signal as the first message over the resources.

2. The method of claim 1, wherein the one or more parameters include at least one of an identifier of the UE, a transmission power used by the UE in transmitting the beacon signal, a power headroom at the UE, or a category identifier for sidelink discovery of the UE.

3. The method of claim 1, wherein the configuration defines resources for transmitting the beacon signal as the first message, wherein the resources include a subset of resources defined as random access occasions for transmitting the random access preamble.

4. The method of claim 1, wherein the configuration defines random access preambles of all or a subset of random access occasions for transmitting the beacon signal as the first message.

5. The method of claim 1, wherein receiving the configuration comprises receiving, from an access point, at least one of system information (SI), radio resource control (RRC) signaling, a media access control (MAC) control element (CE), or downlink control information (DCI), that includes the configuration.

6. The method of claim 1, wherein the configuration further defines at least one of a signal power or quality threshold with respect to a specific synchronization signal block, a prohibit time between transmitting two beacon signals, or an allowed transmit power range for transmitting the beacon signal.

7. The method of claim 1, wherein the configuration further defines a contention-free resources for transmitting the beacon signal, and wherein transmitting the beacon signal is over the contention-free resources.

8. The method of claim 1, wherein the one or more parameters indicate response resources for receiving, from the other UEs, a response signal in response to the beacon signal, and further comprising receiving, from the other UEs, the response signal in response to the first message including the beacon signal over a portion of the response resources.

9. The method of claim 8, wherein the one or more parameters indicate the response resources as at least one of a random access occasion over which to transmit the response signal or a second random access preamble to use in transmitting the response signal.

10. The method of claim 1, further comprising receiving a response signal as a second message in the two-step random access procedure, wherein the response signal indicates the beacon signal is successfully received.

11. The method of claim 10, wherein the response signal also indicates a number of UEs available at a cell of an access point for pairing for sidelink communications.

12. The method of claim 10, wherein the response signal further indicates a number of instances of the beacon signal to transmit following the response signal.

13. The method of claim 1, wherein transmitting the beacon signal comprises transmitting multiple beacon signals as the first message based on a transmit power ramping.

14. The method of claim 1, wherein the one or more parameters indicate a transmission power used by the UE in transmitting the beacon signal.

15. The method of claim 1, wherein the one or more parameters indicate a category identifier for sidelink discovery of the UE.

16. A method for wireless communication, at a user equipment (UE), comprising:
receiving a configuration defining resources for transmitting a first message in a two-step random access procedure, wherein the first message includes a preamble portion and a payload portion, wherein the preamble portion includes a random access preamble, and wherein the payload portion includes a physical uplink shared channel (PUSCH) for transmitting, by a different UE, communications to a network node; and
receiving, based on the configuration and from the different UE, a beacon signal as the first message in the two-step random access procedure such that the PUSCH of the first message includes one or more parameters of the beacon signal discoverable by the UE for use in pairing with the different UE in sidelink communications.

17. The method of claim 16, further comprising determining, based on the beacon signal, to pair with the different UE for sidelink communications.

18. The method of claim 17, wherein determining to pair with the different UE comprises determining whether a transmit power indicated in the beacon signal achieves a threshold.

19. The method of claim 18, wherein determining to pair with the different UE comprises additionally determining whether a transmit power headroom indicated in the beacon signal achieves a second threshold.

20. The method of claim 17, further comprising:
generating, based on determining to pair with the different UE, a response signal to the beacon signal; and
transmitting the response signal as another instance of the first message of the two-step random access procedure.

21. The method of claim 20, wherein the one or more parameters further indicate response resources for transmitting the response signal.

22. The method of claim 21, wherein the one or more parameters indicate the response resources as at least one of a random access occasion over which to transmit the response signal or a second random access preamble to use in transmitting the response signal.

23. The method of claim 20, wherein the configuration further defines response resources for transmitting the response signal.

24. The method of claim 16, further comprising determining, based on the beacon signal, whether to establish a connection with a cell of an access point.

25. An apparatus for wireless communication, comprising:
a transceiver;
a memory configured to store instructions; and
one or more processors communicatively coupled with the transceiver and the memory, wherein the one or more processors are configured to:
receive a configuration defining resources for transmitting a first message in a two-step random access procedure, wherein the first message includes a preamble portion and a payload portion, wherein the preamble portion includes a random access preamble, and wherein the payload portion includes a physical uplink shared channel (PUSCH) for transmitting, by the apparatus, uplink communications to a network node;
generate a beacon signal as the first message in the two-step random access procedure such that the PUSCH of the first message includes one or more parameters of the beacon signal discoverable by other UEs for use in pairing with the apparatus in sidelink communications; and
transmit, based on the configuration, the beacon signal as the first message over the resources.

26. The apparatus of claim 25, wherein the one or more parameters include at least one of an identifier of the apparatus, a transmission power used by the apparatus in transmitting the beacon signal, a power headroom at the apparatus, or a category identifier for sidelink discovery of the apparatus.

27. The apparatus of claim 25, wherein the configuration defines resources for transmitting the beacon signal as the first message, wherein the resources include a subset of resources defined as random access occasions for transmitting the random access preamble.

28. The apparatus of claim 25, wherein the configuration defines random access preambles of all or a subset of random access occasions for transmitting the beacon signal as the first message.

29. The apparatus of claim 25, wherein the one or more processors are configured to receive the configuration from an access point in at least one of system information (SI), radio resource control (RRC) signaling, a media access control (MAC) control element (CE), or downlink control information (DCI).

30. An apparatus for wireless communication, comprising:
a transceiver;
a memory configured to store instructions; and
one or more processors communicatively coupled with the transceiver and the memory, wherein the one or more processors are configured to:
receive a configuration defining resources for transmitting a first message in a two-step random access procedure, wherein the first message includes a preamble portion and a payload portion, wherein the preamble portion includes a random access preamble, and wherein the payload portion includes a physical uplink shared channel (PUSCH) for transmitting, by a different UE, communications to a network node; and
receive, based on the configuration and from the different UE, a beacon signal as the first message in the two-step random access procedure such that the PUSCH of the first message includes one or more parameters of the beacon signal discoverable by the apparatus for use in pairing with the different UE in sidelink communications.

* * * * *